(12) United States Patent
Sasaki (10) Patent No.: US 10,336,101 B2
(45) Date of Patent: Jul. 2, 2019

(54) DROPLET DISCHARGE APPARATUS

(71) Applicant: SEIKO EPSON CORPORATION, Tokyo (JP)

(72) Inventor: Tsuneyuki Sasaki, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 15/981,375

(22) Filed: May 16, 2018

(65) Prior Publication Data

US 2018/0333971 A1    Nov. 22, 2018

(30) Foreign Application Priority Data

May 17, 2017  (JP) ................................. 2017-098019

(51) Int. Cl.
| | |
|---|---|
| B41J 2/01 | (2006.01) |
| B41J 11/00 | (2006.01) |
| B41J 29/38 | (2006.01) |
| G01K 13/00 | (2006.01) |
| B41J 29/377 | (2006.01) |

(52) U.S. Cl.
CPC .......... B41J 11/0015 (2013.01); B41J 11/002 (2013.01); B41J 29/377 (2013.01); B41J 29/38 (2013.01); *B41J 2/01* (2013.01); *G01K 13/00* (2013.01)

(58) Field of Classification Search
CPC ........ B41J 11/0015; B41J 11/002; B41J 2/01; B41J 29/377; B41J 29/393; G01K 13/00

USPC ............................................................ 347/17
See application file for complete search history.

(56) References Cited

U.S. PATENT DOCUMENTS

| | | | | |
|---|---|---|---|---|
| 2003/0048317 A1* | 3/2003 | Usui | ...................... | B41J 29/393 347/14 |
| 2007/0024655 A1* | 2/2007 | Masashi | ................. | B41J 29/393 347/14 |
| 2011/0026964 A1* | 2/2011 | Yasumoto | .............. | G03G 15/50 399/94 |
| 2014/0111586 A1* | 4/2014 | Kumai | ................... | B41J 29/023 347/102 |

FOREIGN PATENT DOCUMENTS

| | | |
|---|---|---|
| JP | 2002-292837 A | 10/2002 |
| JP | 2016-007773 A | 1/2016 |
| JP | 2016-030385 A | 3/2016 |

* cited by examiner

*Primary Examiner* — Huan H Tran
*Assistant Examiner* — Alexander D Shenderov
(74) *Attorney, Agent, or Firm* — Foley & Lardner LLP (57) ABSTRACT

A droplet discharge apparatus includes a head having nozzles capable of discharging droplets onto a medium, a heater configured to heat the medium onto which the droplets are discharged from the head, a blower fan configured to blow outside air from the outside to the inside of a casing that accommodates the head and the heater, and a temperature sensor configured to detect a temperature of outside air blown by the blower fan. If the temperature of outside air detected by the temperature sensor is less than a predetermined set temperature, the air volume of the blower fan is reduced.

10 Claims, 3 Drawing Sheets

DROPLET DISCHARGE APPARATUS

BACKGROUND

1. Technical Field

The present invention relates to a droplet discharge apparatus such as an ink jet printer.

2. Related Art

Droplet discharge apparatuses for discharging ink from a head toward a medium have been provided. As an example droplet discharge apparatus, JP-A-2002-292837 describes an ink jet printer that is provided with a drying section for enhancing drying of ink discharged onto a medium. The drying section blows warm air onto the medium onto which the ink has been discharged to dry the medium.

In the printer described in JP-A-2002-292837, however, the moisture of the ink evaporated by the drying section condenses in the apparatus and this may cause condensation. In particular, condensation on the head for discharging droplets may affect its droplet discharge accuracy.

SUMMARY

An advantage of some aspects of the invention is that there is provided a droplet discharge apparatus capable of suppressing the occurrence of condensation.

Hereinafter, an apparatus for solving the above-mentioned problem and its operational advantages will be described. A droplet discharge apparatus for solving the above-mentioned problem includes a head having nozzles capable of discharging droplets onto a medium; a heater configured to heat the medium onto which the droplets are discharged from the head, a blower fan configured to blow outside air from the outside to the inside of a casing that accommodates the head and the heater, and a temperature sensor configured to detect a temperature of outside air blown by the blower fan. If the temperature of outside air detected by the temperature sensor is less than a predetermined set temperature, the air volume of the blower fan is reduced.

The medium onto which droplets have been discharged by the head is heated by the heater and thereby the moisture of the droplets on the medium evaporates. In this process, the humidity inside the casing becomes high due to the moisture evaporated from the droplets. The high humidity inside the casing will cause condensation inside the casing. To solve the problem, the blower fan blows outside air and thereby the atmosphere inside the casing with the increased humidity is discharged to the outside of the casing. In other words, by blowing outside air by the blower fan, the increase in the humidity inside the casing can be suppressed.

Condensation tends to occur not only when the humidity in the atmosphere is high but also when the temperature in the atmosphere is low. If the temperature of outside air blown by the blower fan is less than the predetermined set temperature, the inside of the casing heated by the heater is cooled by the outside air blown from the outside of the casing and thereby condensation may occur.

To solve the problem, according to this aspect, if the temperature of outside air is less than the predetermined set temperature, the air volume of the blower fan is reduced. In other words, by reducing the volume of outside air blown from the outside to the inside of the casing, the temperature decrease inside the casing can be suppressed. Accordingly, the occurrence of condensation can be suppressed.

It is preferable that in the droplet discharge apparatus, if the temperature of outside air detected by the temperature sensor is less than the set temperature and an amount of droplets to be discharged per unit time by the head is greater than a predetermined set amount, the air volume of the blower fan be reduced.

Since the amount of moisture evaporated by heating by the heater varies depending on the amount of droplets discharged by the head, the degree of increase in the humidity inside the casing varies. According to the above-described configuration, if the amount of droplets to be discharged per unit time by the head is greater than the predetermined set amount, that is, if the humidity inside the casing is expected to increase largely, the air volume of the blower fan is reduced. By this operation, the decrease in temperature inside the casing in a state in which the humidity inside the casing is high, that is, in a state in which condensation tends to occur can be suppressed, and thereby the occurrence of condensation can be suppressed.

It is preferable that the droplet discharge apparatus further include a humidity sensor configured to detect a humidity of outside air blown by the blower fan, and if the humidity of outside air detected by the humidity sensor is less than a predetermined set humidity, the air volume of the blower fan be reduced.

If the humidity inside the casing decreases, while condensation will hardly occur, the nozzles of the head tend to be dried. The nozzles that tend to be dried may cause nozzle clogging and may affect the accuracy of droplet discharge by the head. To solve the problem, according to this configuration, if the temperature of outside air is less than the predetermined set temperature, the air volume of the blower fan is reduced. In other words, by reducing the amount of outside air blown from the outside to the inside of the casing, the decrease in humidity inside the casing can be suppressed. Accordingly, drying of the nozzles can be suppressed.

It is preferable that in the droplet discharge apparatus, if the humidity of outside air detected by the humidity sensor is less than the set humidity and an amount of droplets to be discharged per unit time by the head is less than a predetermined set amount, the air volume of the blower fan be reduced.

Since the amount of droplets evaporated by heating by the heater varies depending on the amount of droplets discharged by the head, the degree of increase in the humidity inside the casing varies. According to the above-described configuration, if the amount of droplets to be discharged per unit time by the head is less than the predetermined set amount, that is, if the humidity inside the casing is not expected to increase so much, the air volume of the blower fan is reduced. By this operation, further decrease in humidity inside the casing in a state in which the humidity inside casing is low can be suppressed and drying of the nozzles can be suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
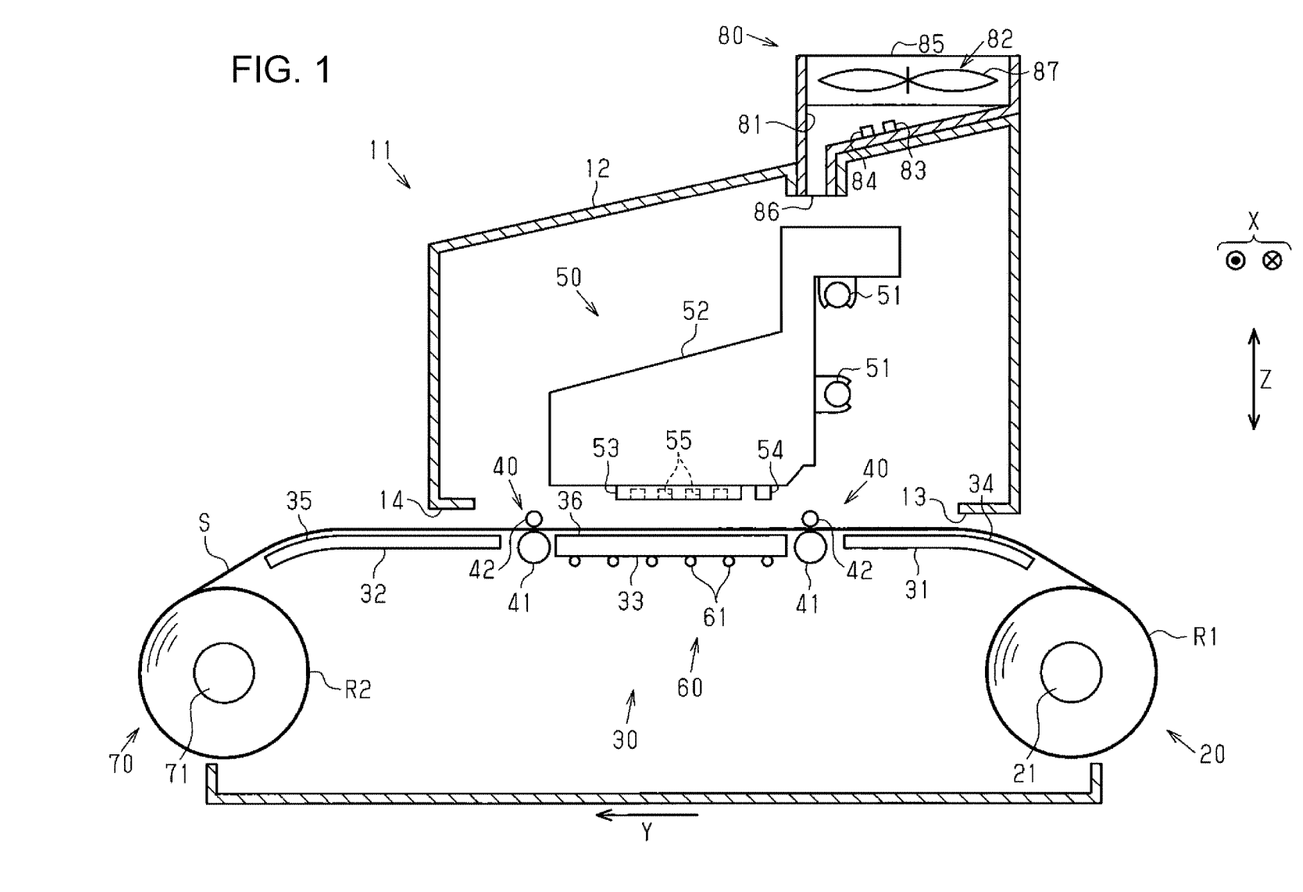
FIG. 1 is a side view schematically illustrating a droplet discharge apparatus according to an embodiment.

Hereinafter, a droplet discharge apparatus according to an embodiment will be described with reference to the attached drawings. As illustrated in FIG. 1, a droplet discharge apparatus 11 includes a casing 12. The droplet discharge apparatus 11 includes a feeding section 20 that feeds a medium S and a medium support section 30 that supports the medium S that has been fed from the feeding section 20. The droplet discharge apparatus 11 includes a transport section 40 that transports the medium S along the medium support section 30 in a transport direction Y. The droplet discharge apparatus 11 includes a print section 50 that prints characters and images such as photos on the medium S and heating section 60 that heats the medium S onto which printing has been performed by the print section 50. The droplet discharge apparatus 11 includes a winding section 70 that winds the medium S onto which printing has been performed by the print section 50 and a ventilation section 80 that ventilates the inside of the casing 12.

The feeding section 20 is disposed such that a part of the feeding section 20 is exposed to the outside of the casing 12. The feeding section 20 includes a feeding shaft 21 that detachably holds a roll body R1 of wound medium S. The feeding shaft 21, which holds the roll body R1, of the feeding section 20 rotates to unwind and feed the medium S from the roll body R1. The feeding shaft 21 of the feeding section 20 according to the embodiment rotates in the counterclockwise direction to feed the medium S. In this embodiment, the medium S is a paper sheet.

The medium support section 30 includes a first guide portion 31, a second guide portion 32, and a support portion 33 each of which is a plate-like member. The first guide portion 31 is disposed such that a part of the first guide portion 31 is exposed to the outside of the casing 12. The first guide portion 31 supports the medium S that has been fed from the feeding section 20 through a supply port 13, which is an opening of the casing 12, so as to guide the medium S toward the inside of the casing 12. The support portion 33 is disposed in the casing 12 to support the medium S that has been guided to the first guide portion 31. The second guide portion 32 is disposed such that a part of the second guide portion 32 is exposed to the outside of the casing 12 and supports the medium S that passes on the support portion 33 through a discharge port 14, which is an opening of the casing 12, so as to guide the medium S toward the outside of the casing 12. In other words, the first guide portion 31 is disposed on the upstream side of the support portion 33 in a transport direction Y. The second guide portion 32 is disposed on the downstream side of the support portion 33 in the transport direction Y.

Upper surfaces of the first and second guide portions 31 and 32 serve as guide surfaces 34 and 35 for guiding the medium S. An upper surface of the support portion 33 serve as a support surface 36 for supporting the medium S. In this embodiment, the transport direction Y in which the medium S is transported refers to a direction in which the medium S moves on the support surface 36 of the support portion 33. In this embodiment, the support surface 36 of the support portion 33 extends horizontally. A part of the guide surface 34 of the first guide portion 31 and a part of the guide surface 35 of the second guide portion 32 are curved with respect to the support surface 36 respectively.

The transport section 40 is disposed in the casing 12. In this embodiment, two transport sections 40 are provided each between the first guide portion 31 and the support portion 33 and between the support portion 33 and the second guide portion 32 respectively. Each of the transport sections 40 include a driving roller 41 that can rotate for driving and a driven roller 42 that can be rotated in response to the rotation of the driving roller 41. The transport section 40 rotates while nipping the medium S with the driving roller 41 and the driven roller 42 to transport the medium S along the medium support section 30. In this embodiment, the driving roller 41 can come into contact with the medium S from below in a vertical direction Z. The driven roller 42 can come into contact with the medium S from above in the vertical direction Z.

The print section 50 is disposed in the casing 12 so as to face the support portion 33. The print section 50 includes a guiding shaft 51 that extends in a width direction X of the transported medium S, a carriage 52 that is supported by the guiding shaft 51, a head 53 that is mounted on the carriage 52, and a temperature and humidity detector 54. The carriage 52 can be moved along the guiding shaft 51, that is, the carriage 52 can be moved in the width direction X. In this embodiment, two guiding shafts 51 are provided.

The head 53 is mounted on the carriage 52 so as to be exposed from a lower surface of the carriage 52. The head 53 includes a plurality of nozzles 55 that are provided on a lower surface of the head 53 that faces the support portion 33 and can discharge an ink, which is an example liquid, in the form of droplets. The head 53 discharges droplets from the nozzles 55 onto the medium S that is supported by the support portion 33 and thereby an image is printed on the medium S. In this embodiment, the ink to be discharged by the head 53 is a water-based resin. Water is used as the solvent of the water-based resin. The temperature and humidity detector 54 is attached to the lower surface of the carriage 52 so as to be adjacent to the head 53. The temperature and humidity detector 54 can detect a temperature and humidity in the vicinity of the head 53 in the casing 12.

The droplet discharge apparatus 11 according to the embodiment is generally used in a state in which the droplet discharge apparatus 11 is installed on a horizontally extending floor surface. The droplet discharge apparatus 11 according to the embodiment is formed such that the support surface 36 of the support portion 33 and a floor surface to be installed are substantially parallel. Accordingly, in a coordinate system of three axes of X axis, Y axis, and Z axis, which are orthogonal to each other, if the coordinate axes are taken such that the Z axis extends in the vertical direction Z, the horizontally extending floor surface is a plane defined by the X axis and the Y axis. In other words, the support surface 36 of the support portion 33 is a plane defined by the X axis and the Y axis.

Then, the vertical direction Z and the extending direction of the Z axis are placed to coincide with each other and the coordinate axes are set such that the X axis extends along the guiding shaft 51, that is, extends in the width direction X. Accordingly, in the droplet discharge apparatus 11 according to the embodiment, the extending direction of the Y axis coincides with the transport direction Y. The X axis extending in the width direction X, the Y axis extending in the transport direction Y, and the Z axis extending in the vertical direction Z are orthogonal to each other. In this embodiment, consequently, the width direction X, the transport direction Y, and the vertical direction Z indicate different three directions respectively.

The heating section 60 is disposed in the casing 12 and attached to the lower surface of the support portion 33. The heating section 60 according to the embodiment includes a plurality of heaters 61 disposed on the lower surface of the support portion 33 at predetermined intervals in the transport direction Y. The heaters 61 are, for example, tube heaters that are disposed so as to extend in the width direction X and generate heat when energized. The heaters 61 heat the support portion 33 from the lower surface so as to indirectly heat the medium S that is located on the support surface 36, which is the upper surface of the support portion 33. In other words, the heaters 61 heat the support portion 33 to heat the medium S onto which droplets are discharged by the head 53. The heaters 61 evaporate the moisture of the droplets discharged onto the medium S from the head 53 and thereby the fixation of the image printed on the medium S is enhanced. The heater 61 according to the embodiment is configured to generate heat at a predetermined temperature.

The winding section 70 is disposed such that a part of the winding section 70 is exposed to the outside of the casing 12. The winding section 70 includes a winding shaft 71 that detachably holds a roll body R2 of wound medium S. The roll body R2 is formed by winding the medium S, on which images have been formed with the droplets discharged by the head 53, by the winding shaft 71. The winding shaft 71 of the winding section 70 according to the embodiment rotates in the counterclockwise direction to wind the medium S.

The ventilation section 80 is disposed in an upper section of the casing 12 and a part of the ventilation section 80 is exposed to the outside of the casing 12. The ventilation section 80 includes an inlet passage 81 through which outside air flows from the outside of the casing 12 into the casing 12 and a blower fan 82 that blows outside air through the inlet passage 81 into the casing 12. The ventilation section 80 includes a temperature sensor 83 that detects a temperature of outside air blown into by the blower fan 82 and a humidity sensor 84 that detects a humidity of outside air blown into by the blower fan 82. The inlet passage 81 is provided through the casing 12, and includes an inlet 85 that is open to the outside of the casing 12 and an outlet 86 that is open to the inside of the casing 12. The inlet 85 is wider than the outlet 86. The outlet 86 is wide and extends in the width direction X.

The blower fan 82 is disposed in the inlet passage 81 at a position close to the inlet 85. The blower fan 82 according to the embodiment is, for example, an axial fan, and blows outside air by rotating blades of the blower fan 82. The temperature sensor 83 and the humidity sensor 84 are disposed in the inlet passage 81 at positions closer to the outlet 86 than the blower fan 82 respectively. In other words, the temperature sensor 83 and the humidity sensor 84 detect a temperature and a humidity of outside air that is blown through the inlet passage 81 by driving the blower fan 82.

The ventilation section 80 drives the blower fan 82 to blow outside air through the inlet passage 81 toward an area where a carriage 52 reciprocates in the casing 12. The atmosphere inside the casing 12 is discharged to the outside of the casing 12 from the supply port 13 and the discharge port 14 by the outside air that is blown into the casing 12 through the inlet passage 81. At the same time, matter suspended in the casing 12, such as mist of the ink discharged from the head 53, paper dust produced from the medium S, and the like, is discharged to the outside of the casing 12 together with the atmosphere inside the casing 12.

The blower fan 82 can be driven in two modes, that is, a first mode and a second mode. The blower fan 82 that is driven in the first mode blows outside air from the outside to the inside of the casing 12 through the outlet 86 in a first air volume. The blower fan 82 that is driven in the second mode blows outside air from the outside to the inside of the casing 12 through the outlet 86 in a second air volume. The first air volume is larger than the second air volume. In other words, the blower fan 82 can be switched between the first mode in which the blower fan 82 blows a relatively large volume of air and the second mode in which the blower fan 82 blows a relatively small volume of air. In this embodiment, the blower fan 82 in the first mode blows outside air through the outlet 86 at a wind velocity of 1.0 m/s. The blower fan 82 in the second mode blows outside air through the outlet 86 at a wind velocity of 0.5 m/s. In this embodiment, the air volume refers to the volume of gas blown per unit time.

The volume of outside air blown through the outlet 86 into the casing 12 is calculated by multiplying the area of the opening of the outlet 86 by the velocity of outside air blown through the outlet 86. Consequently, when the velocity of outside air blown through the outlet 86 varies, the volume of outside air blown through the outlet 86 into the casing 12 varies. In this embodiment, the rotation speed of the blades 87 of the blower fan 82 is changed to change the volume of outside air blown through the outlet 86. The change in the rotation speed of the blades 87 of the blower fan 82 changes the velocity of outside air blown from the inlet 85 into the inlet passage 81. Consequently, when the velocity of outside air blown from the inlet 85 into the inlet passage 81 varies, the velocity of outside air blown through the outlet 86 into the casing 12 varies. In this embodiment, the volume of outside air blown through the outlet 86 into the casing 12 is defined as the air volume of the blower fan 82.

Figure 2:
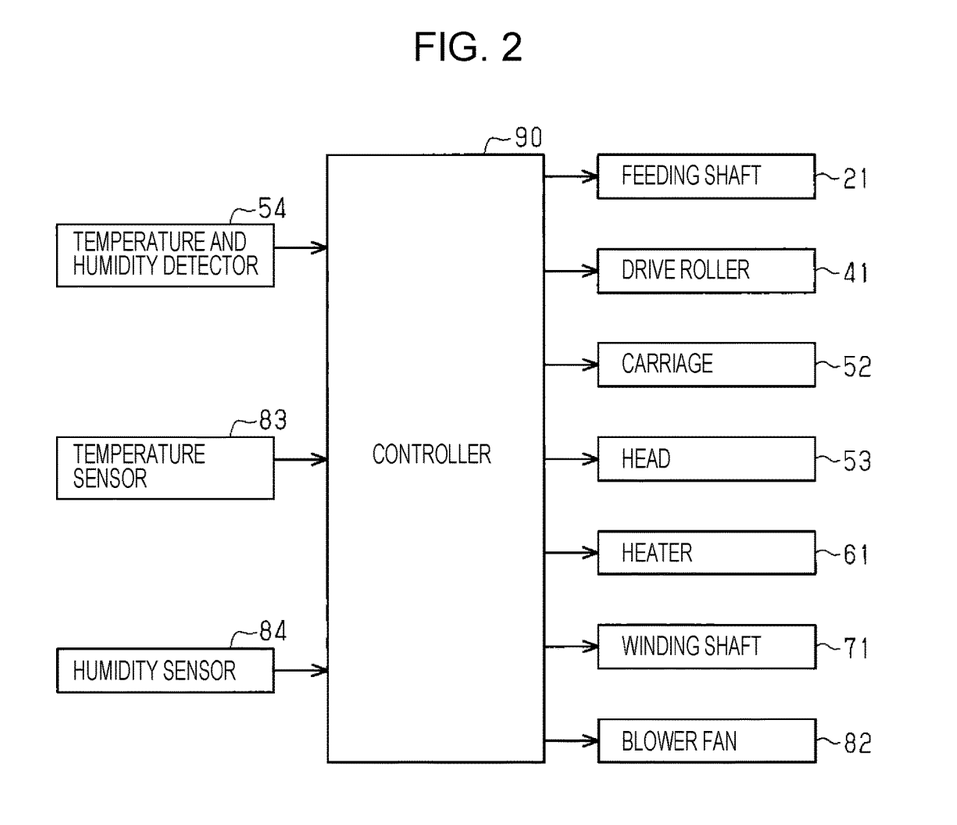
FIG. 2 is a block diagram illustrating an electrical configuration of the droplet discharge apparatus.

Next, an electrical configuration of the droplet discharge apparatus 11 will be described. As illustrated in FIG. 2, the droplet discharge apparatus 11 includes a controller 90 that performs overall control of the apparatus. The controller 90 is electrically connected to each of the temperature and humidity detector 54, the temperature sensor 83, and the humidity sensor 84. The controller 90 can receive signals transmitted from the temperature and humidity detector 54, the temperature sensor 83, and the humidity sensor 84. The temperature and humidity detector 54 can transmit a signal based on detected temperature and humidity in the vicinity of the nozzles 55 to the controller 90. The temperature sensor 83 can transmit a signal based on a detected temperature of outside air to the controller 90. The humidity sensor 84 can transmit a signal based on a detected humidity of outside air to the controller 90.

The controller 90 is electrically connected to each of the feeding shaft 21, the driving roller 41, the carriage 52, the head 53, the heaters 61, the winding shaft 71, and the blower fan 82. The controller 90 can transmit a signal to each of the feeding shaft 21, the driving roller 41, the carriage 52, the head 53, the heaters 61, the winding shaft 71, and the blower fan 82 to control driving of the component. The droplet discharge apparatus 11 according to the embodiment can communicate with an external terminal such as a personal computer. In other words, the controller 90 can receive information such as a print job transmitted from an external terminal.

Next, an operation of the droplet discharge apparatus 11 having the above-described configuration will be described. The powered-on droplet discharge apparatus 11 first drives the heaters 61 and the blower fan 82. When the heaters 61 are driven, the temperature inside the casing 12 rises due to the heat generated by the heaters 61. Accordingly, in this embodiment, the temperature inside the casing 12 is higher than the temperature of outside air. Due to the temperature rise inside the casing 12, the inside of the casing 12 becomes an environment suitable for drying the medium S. The heaters 61 are driven at the time of power-on of the droplet discharge apparatus 11 because it takes time to increase the temperature inside the casing 12 to a predetermined temperature by the heaters 61. The heaters 61 heat the medium S on the support portion 33. Accordingly, in the interior of the casing 12, the temperature in the vicinity of the nozzles 55 of the head 53 that faces the support portion 33 tends to rise.

In response to driving of the blower fan 82, outside air is blown into the casing 12. The blower fan 82 is driven at the time of power-on of the droplet discharge apparatus 11 to prevent the temperature inside the casing 12 from being excessively increased due to the heat generated by the heaters 61. Accordingly, the blower fan 82 continues blowing outside air into the casing 12 while the heaters 61 are being driven. The blower fan 82 according to the embodiment is driven in the first mode when the droplet discharge apparatus 11 is powered on. In other words, in response to power-on of the droplet discharge apparatus 11, the blower fan 82 blows outside air into the casing 12 in the first air volume. It should be noted that the blower fan 82 may be driven after the temperature inside the casing 12 detected by the temperature and humidity detector 54 has exceed a predetermined value. In this embodiment, when the temperature inside the casing 12 of the powered-on droplet discharge apparatus 11 exceeds a predetermined value, the droplet discharge apparatus 11 can perform printing onto the medium S.

In the droplet discharge apparatus 11 according to the embodiment that includes the heating section 60 for enhancing the fixation of the image printed on the medium S, the heaters 61 evaporate the moisture of the droplets discharged onto the medium S and thus the humidity inside the casing 12 increases. Accordingly, in this embodiment, the humidity inside the casing 12 will become higher than the humidity of outside air. The high humidity inside the casing 12 causes condensation inside the casing 12.

Since the heaters 61 heat the medium S on the support portion 33, in the interior of the casing 12, the humidity in the vicinity of the nozzles 55 of the head 53 that faces the support portion 33 tends to increase. Consequently, condensation tends to occur on the lower surface of the head 53 on which the nozzles 55 are provided. If condensation occurs on the lower surface of the head 53, droplets discharged from the nozzles 55 may come into contact with the water drops formed by the condensation, affecting the discharge accuracy of the nozzles 55. The droplet discharge apparatus 11 according to the embodiment, however, blows outside air into the casing 12 by the blower fan 82, and thereby the increase in the humidity inside the casing 12, in particular, the humidity in the vicinity of the nozzles 55 detected by the temperature and humidity detector 54 can be suppressed. The blower fan 82 blows outside air into the casing 12 and thereby the evaporation of moisture of the droplets discharged onto the medium S is enhanced.

Figure 3:
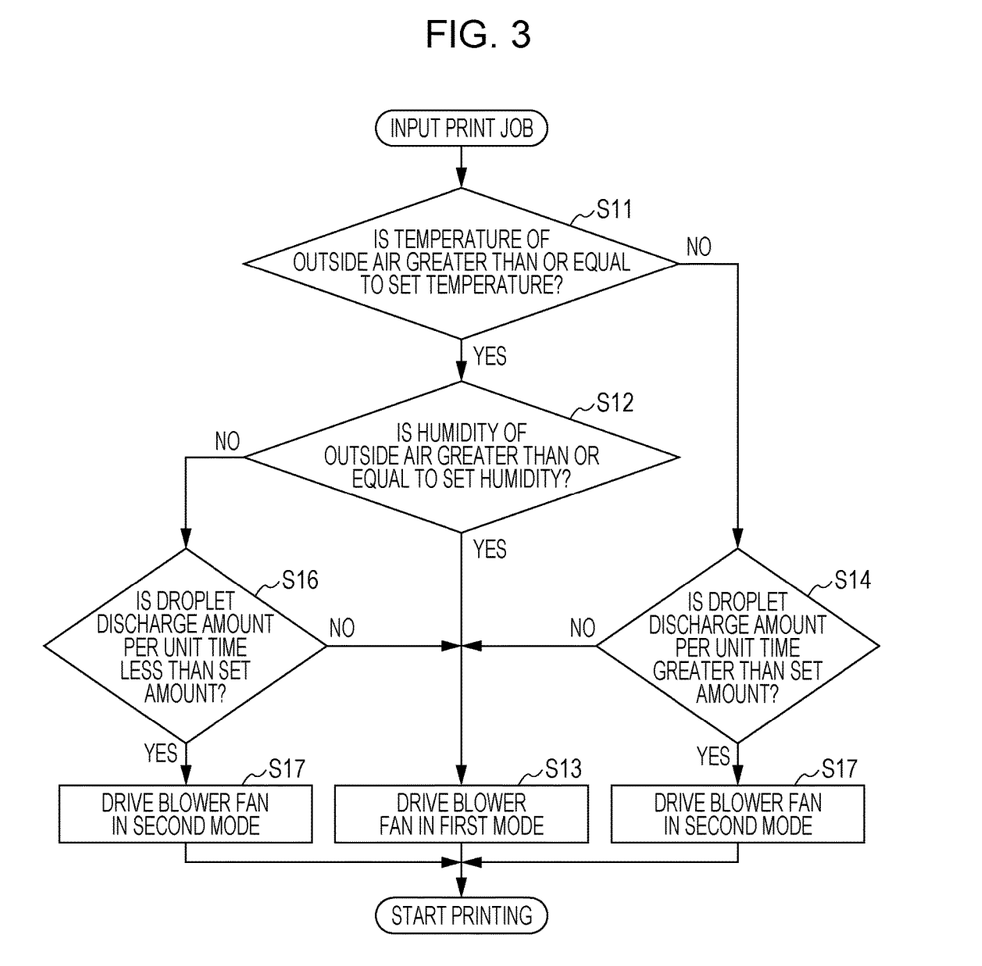
FIG. 3 is a flowchart illustrating a process routine to be implemented by a controller.

As illustrated in FIG. 3, when a print job for printing an image onto the medium S is input from an external terminal, in step S11, the controller 90 determines whether the temperature of outside air is greater than or equal to a set temperature. In this process, the controller 90 compares the temperature of outside air detected by the temperature sensor 83 and the set temperature that has been set to the controller 90. In this embodiment, the blower fan 82 is driven at the time of power-on of the droplet discharge apparatus 11 and thus the temperature of outside air can be accurately detected by the temperature sensor 83 that is disposed in the inlet passage 81. The set temperature is defined as a temperature at which condensation tends to occur inside the casing 12. The set temperature is set in consideration of the size of the casing 12, the usage environment of the droplet discharge apparatus 11, and other factors. In other words, when the temperature of outside air is less than the set temperature, the inside of the casing 12 that has been heated by the heaters 61 is cooled by the outside air blown into the casing 12, and thereby condensation tends to occur inside the casing 12. In this embodiment, it is preferable that the set temperature be set within the range of 10 degrees to 25 degrees. The set temperature is, more preferably, 20 degrees. If the controller 90 determines that the temperature of outside air is greater than or equal to the set temperature, the processing proceeds to step S12. If the controller 90 determines that the temperature of outside air is less than the set temperature, the processing proceeds to step S14.

In step S12, the controller 90 determines whether the humidity of outside air is greater than or equal to a set humidity. In this process, the controller 90 compares the humidity of outside air detected by the humidity sensor 84 and the set humidity that has been set to the controller 90. In this embodiment, the blower fan 82 is driven at the time of power-on of the droplet discharge apparatus 11 and thus the humidity of outside air can be accurately detected by the humidity sensor 84 that is disposed in the inlet passage 81. The set humidity is defined as a humidity at which nozzle clogging of head 53 tends to occur. The set humidity is set in consideration of the size of the casing 12, the usage environment of the droplet discharge apparatus 11, and other factors. In other words, when the humidity of outside air is less than the set humidity, the humidity of the inside of the casing 12 is decreased by the outside air blown into the casing 12, and thereby the inside of the casing 12 is dried. When the inside of the casing 12 is dried, the liquid in the nozzles 55 is fixed and the nozzles 55 tend to be clogged. In this embodiment, it is preferable that the set humidity be set within the range of 25% to 45%. The set humidity is, more preferably, 40%. If the controller 90 determines that the humidity of outside air is greater than or equal to the set humidity, the processing proceeds to step S13. If the controller 90 determines that the humidity of outside air is less than the set humidity, the processing proceeds to step S16.

In step S13, the controller 90 drives the blower fan 82 in the first mode. The blower fan 82 according to the embodiment is driven in the first mode when the droplet discharge apparatus 11 is powered on, and continued to be driven in the first mode. Then, the controller 90 starts the printing based on the print job.

In step S11, if the controller 90 determines that the temperature of outside air is less than the set temperature, in step S14, the controller 90 determines whether the amount of droplets to be discharged by the head 53 per unit time is less than the set amount. In this process, the controller 90 calculates a total amount of the droplets to be discharged onto the medium S by the head 53 in the printing of the image based on the image data included in the input print job. Based on the calculated total amount of droplets, the controller 90 calculates an amount of droplets to be discharged by the head 53 per unit time to print the image. In this embodiment, the controller 90 may calculate a print duty based on the image data included in the print job.

In step S14, the controller 90 compares the calculated amount of droplets to be discharged with the set amount that has been set to the controller 90. The set amount is a value set as an index that indicates a degree of increase in humidity inside the casing 12. The set amount is set in consideration of the size of the casing 12, the usage environment of the droplet discharge apparatus 11, and other factors. In other words, when an amount of droplets to be discharged is greater than the set amount, the humidity inside the casing 12 will increase largely. In this embodiment, it is preferable that the set value be set such that a print duty with respect to the medium S becomes 40% to 60%, and more preferably, set to an amount such that the print duty becomes 50%.

In this embodiment, the print duty is defined as a ratio of the area occupied by the liquid discharged onto the medium S from the head 53 on the medium S and the area of the medium S, that is, the coverage rate of the liquid on the image formed on the medium S. If the print duty is 100%, the droplet discharge apparatus 11 performs so-called solid printing in which droplets are discharged over the entire area of the medium S. The print section 50 according to the embodiment can discharge droplets of an amount corresponding to a print duty that exceeds 100%. In such a case of discharging droplets of an amount corresponding to a print duty that exceeds 100%, however, bleeding may occur on the medium S. If the print duty is 100%, consequently, the droplet discharge apparatus 11 performs solid printing by discharging droplets of an amount not causing bleeding to the medium S.

If the controller 90 determines that the amount of droplets to be discharged is greater than the set amount, the processing proceeds to step S15. If the controller 90 determines that the amount of droplets to be discharged is less than or equal to the set amount, the processing proceeds to step S13.

In step S15, the controller 90 drives the blower fan 82 in the second mode. In other words, the controller 90 changes the driving state of the blower fan 82 from the first mode to the second mode and changes the air volume of the blower fan 82 from the first air volume to the second air volume. Specifically, the controller 90 performs control so as to reduce the air volume of the blower fan 82. In this process, since the amount of droplets to be discharged by the head 53 is greater than the set amount, when the printing is started, the humidity inside the casing 12 will largely increase. Accordingly, the inside of the casing 12 will become an environment in which condensation tends to occur. Furthermore, since the temperature of outside air is less than the set temperature, depending on the air volume of the blower fan 82 that blows outside air into the casing 12, the inside of the casing 12 is cooled and condensation will occur inside the casing 12.

To solve the problem, the droplet discharge apparatus 11 according to the embodiment reduces the air volume of the blower fan 82 if the temperature of outside air is less than the set temperature. In particular, if the temperature of outside air is less than the set temperature and the amount of droplets to be discharged is greater than the set amount, the air volume of the blower fan 82 is reduced. Specifically, if the temperature of outside air is greater than or equal to the set temperature and the humidity of outside air is greater than or equal to the set humidity, the air volume of the blower fan 82 is reduced to an air volume less than the air volume (the first air volume) of the blower fan 82 that is driven in the first mode. Then, the controller 90 starts the printing based on the print job.

In step S12, if the controller 90 determines that the humidity of outside air is less than the set humidity, in step S16, the controller 90 determines whether the amount of droplets to be discharged per unit time by the head 53 is less than the set amount. In this process, similarly to the process in step S14, the controller 90 calculates a total amount of the droplets to be discharged onto the medium S by the head 53 in the printing of the image based on the image data included in the input print job. Based on the calculated total amount of droplets, the controller 90 calculates an amount of droplets to be discharged per unit time by the head 53 to print the image. In this embodiment, the controller 90 may calculate a print duty based on the image data included in the print job.

The controller 90 compares the calculated amount of droplets to be discharged with the set amount that has been set to the controller 90. The set amount is the same as the set amount referred to in step S14. If an amount of droplets to be discharged is less than the set amount, the humidity inside the casing 12 will not increase so much. If the controller 90 determines that the amount of droplets to be discharged is less than the set amount, the processing proceeds to step S17. If the controller 90 determines that the amount of droplets to be discharged is greater than or equal to the set amount, the processing proceeds to step S13.

In step S17, similarly to the process in step S15, the controller 90 drives the blower fan 82 in the second mode. The controller 90 changes the driving state of the blower fan 82 from the first mode to the second mode and changes the air volume of the blower fan 82 from the first air volume to the second air volume. Specifically, the controller 90 performs control so as to reduce the air volume of the blower fan 82. In this process, since the amount of droplets to be discharged by the head 53 is less than the set value, when the printing is started, the humidity inside the casing 12 will not increase so much. Accordingly, the inside of the casing 12 will become an environment in which nozzle clogging tends to occur. Furthermore, since the humidity of outside air is less than the set humidity, depending on the air volume of the blower fan 82 that blows outside air into the casing 12, the inside of the casing 12 is further dried and the risk of nozzle clogging further increases.

To solve the problem, the droplet discharge apparatus 11 according to the embodiment reduces the air volume of the blower fan 82 if the temperature of outside air is greater than or equal to the set temperature and the humidity of outside air is less than the set humidity. In particular, if the temperature of outside air is greater than or equal to the set temperature, the humidity of outside air is less than the set humidity, and the amount of droplets to be discharged is less than the set amount, the air volume of the blower fan 82 is reduced. Specifically, if the temperature of outside air is greater than or equal to the set temperature and the humidity of outside air is greater than or equal to the set humidity, the air volume of the blower fan 82 is reduced to an air volume less than the air volume (the first air volume) of the blower fan 82 that is driven in the first mode. Then, the controller 90 starts the printing based on the print job.

According to the above-described embodiment, the following advantages can be achieved.

1. The medium S onto which droplets have been discharged by the head 53 is heated by the heaters 61 and thereby the moisture of the droplets on the medium S evaporates. In this process, the humidity inside the casing 12 becomes high due to the moisture evaporated from the droplets. The high humidity inside the casing 12 will cause condensation inside the casing 12. To solve the problem, the blower fan 82 blows outside air and thereby the atmosphere inside the casing 12 with the increased humidity is discharged to the outside of the casing 12. In other words, by blowing outside air by the blower fan 82, the increase in the humidity inside the casing 12 can be suppressed.

Condensation tends to occur not only when the humidity in the atmosphere is high but also when the temperature in the atmosphere is low. If the temperature of outside air blown by the blower fan 82 is less than the predetermined set temperature, the inside of the casing 12 heated by the heaters 61 is cooled by the outside air blown from the outside of the casing 12 and thereby condensation may occur.

To solve the problem, according to the embodiment, if the temperature of outside air is less than the predetermined set temperature, the air volume of the blower fan 82 is reduced. In other words, by reducing the volume of outside air blown from the outside to the inside of the casing 12, the temperature decrease inside the casing 12 can be suppressed. Accordingly, the occurrence of condensation can be suppressed.

2. Since the amount of moisture evaporated by heating by the heaters 61 varies depending on the amount of droplets discharged by the head 53, the degree of increase in the humidity inside the casing 12 varies. According to the above-described embodiment, if the amount of droplets to be discharged per unit time by the head 53 is greater than the predetermined set amount, that is, if the humidity inside the casing 12 is expected to increase largely, the air volume of the blower fan 82 is reduced. By this operation, the decrease in temperature inside the casing 12 in a state in which the humidity inside the casing 12 is high, that is, in a state in which condensation tends to occur can be suppressed, and thereby the occurrence of condensation can be suppressed.

3. If the humidity inside the casing 12 decreases, while condensation will hardly occur, the nozzles 55 of the head 53 tend to be dried. The nozzles 55 that tend to be dried may cause nozzle clogging and may affect the accuracy of droplet discharge by the head 53. To solve the problem, according to the embodiment, if the humidity of outside air is less than the predetermined set humidity, the air volume of the blower fan 82 is reduced. In other words, by reducing the amount of outside air blown from the outside to the inside of the casing 12, the decrease in humidity inside the casing 12 can be suppressed. Accordingly, drying of the nozzles 55 can be suppressed.

4. Since the amount of moisture evaporated by heating by the heaters 61 varies depending on the amount of droplets discharged by the head 53, the degree of increase in the humidity inside the casing 12 varies. According to the above-described embodiment, if the amount of droplets to be discharged per unit time by the head 53 is less than the predetermined set amount, that is, if the humidity inside the casing 12 is not expected to increase so much, the air volume of the blower fan 82 is reduced. By this operation, further decrease in humidity inside the casing 12 in a state in which the humidity inside casing 12 is low can be suppressed and drying of the nozzles 55 can be suppressed.

The above-described embodiment can be modified as described below. It should be noted that the following modifications may be combined as appropriate. The droplet discharge apparatus 11 may omit the humidity sensor 84. Furthermore, the droplet discharge apparatus 11 may not calculate the amount of droplets to be discharged per unit time by the head 53. In other words, the droplet discharge apparatus 11 may not perform the processes in step S12, S14, S16, and S17 in the flowchart in FIG. 3. In such a case, if the temperature of outside air is greater than or equal to the set temperature, the blower fan 82 blows outside air in the first air volume. If the temperature of outside air is less than the set temperature, the blower fan 82 blows outside air in the second air volume. In summary, if the temperature of outside air is less than the set temperature, the blower fan 82 reduces the air volume of the blower fan 82.

The droplet discharge apparatus 11 may omit the humidity sensor 84. In other words, the droplet discharge apparatus 11 may not perform the processes in step S12, S16, and S17 in the flowchart in FIG. 3. In such a case, if the temperature of outside air is greater than or equal to the set temperature, the blower fan 82 blows outside air in the first air volume. If the temperature of outside air is less than the set temperature and the amount of droplets to be discharged per unit time by the head 53 is less than or equal to the set amount, the blower fan 82 blows outside air in the first air volume. If the temperature of outside air is less than the set temperature and the amount of droplets to be discharged per unit time by the head 53 is greater than the set amount, the blower fan 82 blows outside air in the second air volume. In summary, if the temperature of outside air is less than the set temperature and the amount of droplets to be discharged per unit time is greater than the set amount, the air volume of the blower fan 82 is reduced.

The droplet discharge apparatus 11 may not calculate the amount of droplets to be discharged per unit time by the head 53. The droplet discharge apparatus 11 may not perform the processes in step S14 and S16 in the flowchart in FIG. 3. In such a case, if the temperature of outside air is greater than or equal to the set temperature and the humidity of outside air is greater than or equal to the set humidity, the blower fan 82 blows outside air in the first air volume. In such a case, if the temperature of outside air is less than the set temperature or the humidity of outside air is less than the set humidity, the blower fan 82 blows outside air in the second air volume. In summary, if the temperature of outside air is less than the set temperature or the humidity of outside air is less than the set humidity, the air volume of the blower fan 82 is reduced. In the flowchart in FIG. 3, the droplet discharge apparatus 11 may not perform only the process in step S14 or may not perform only the process in step S16.

The droplet discharge apparatus 11 is not limited to perform the process routine illustrated in FIG. 3 at the timing print job is input. For example, in printing an image, the droplet discharge apparatus 11 may perform the process routine illustrated in FIG. 3 every time the carriage 52 that reciprocates in the width direction X passes through above the medium S. In other words, every time the head 53 performs printing of one scan on the medium S, the air volume of the blower fan 82 may be determined. In such a case, the droplet discharge apparatus 11 can more minutely control the air volume of the blower fan 82, and thereby the occurrence of condensation can be further suppressed.

It should be noted that the set amount in step S14 may differ from the set value in step S16. Furthermore, in step S14 and step S16, the controller 90 may not calculate the amount of droplets to be discharged per unit time by the head 53. For example, in step S14 and step S16, the total amount of droplets to be discharged onto the medium S by the head 53 in printing an image may be compared with the predetermined set amount that has been set to the controller 90. In such a case, it is preferable that the set amount be set such that a print duty becomes 40% to 60%, and more preferably, set to an amount such that the print duty becomes 50%.

When the droplet discharge apparatus 11 is powered on, the blower fan 82 may not be driven in the first mode. For example, when the droplet discharge apparatus 11 is powered on, the blower fan 82 may be driven so as to blow air in a third air volume that is less than the first air volume and greater than the second air volume.

The droplet discharge apparatus 11 may include a sensor for detecting a temperature of a liquid supplied to the head 53. The droplet discharge apparatus 11 according to the embodiment includes a liquid container for storing a liquid to be supplied to the head 53. Such a liquid container is generally disposed at a position easily accessed from the outside of the casing 12 for convenience in replacement, replenishment of liquid, and the like. Accordingly, the liquid stored in the liquid container has a temperature close to the temperature of outside air. In other words, if the amount of droplets to be discharged by the head 53 is large, the head 53 is cooled by the liquid supplied from the liquid container, and thus condensation may occur on the head 53. To solve the problem, the droplet discharge apparatus 11 may control the air volume of the blower fan 82 based on a detection result detected by a sensor that detects a temperature of a liquid supplied to the head 53.

The transport section 40 may be provided only between the first guide portion 31 and the support portion 33 or may be provided at three or more points. The droplet discharge apparatus 11 may include the heating sections 60 also in the first guide portion 31 and the second guide portion 32.

The set humidity set to the controller 90 may be an absolute humidity instead of a relative humidity. The blower fan 82 may be, for example, a centrifugal fan. The medium S is not limited to the continuous paper that is fed from the roll body R1, but may be single sheets of paper. The medium S is not limited to the paper, but may be a plastic film, a metal film, cloth, or the like.

The print section 50 may be a so-called line head that is long in the width direction X and arranged in a fixed manner in the casing 12. The droplet discharge apparatus 11 may be a droplet discharge apparatus that ejects or discharges liquid other than ink. The state of the liquid discharged as a minute amount of droplets from the droplet discharge apparatus includes granular droplets, tear droplets, or stringy droplets. The liquid may be any material that can be discharged from the droplet discharge apparatus. For example, any material in a liquid phase may be used, including a liquid having high or low viscosity, or a fluid material such as sol, gel water, other inorganic solvents, an organic solvent, a solution, a liquid resin, or a liquid metal (metal melt). Further, the liquid is not limited to liquid as one state of a material but includes a liquid in which particles of a functional material composed of a solid material such as a pigment or metal particles are dissolved, dispersed, or mixed in a solvent. Representative examples of the liquid include the ink described in the above embodiment, liquid crystal, and the like. The ink includes inks that contain various kinds of liquid compositions, such as general water-based inks and oil-based inks, gel inks, hot melt inks, and the like. The droplet discharge apparatus may be, for example, a droplet discharge apparatus that discharges a liquid containing a dispersed or dissolved material such as an electrode material or a color material to be used for manufacturing liquid crystal displays, electroluminescence (EL) displays, field emission displays (FEDs), or color filters. Furthermore, the droplet discharge apparatus may be a droplet discharge apparatus that discharges a bioorganic material to be used for biochip manufacture, a droplet discharge apparatus that is used as a precision pipette and discharges a liquid that is used as a sample, a textile printing apparatus, a micro dispenser, or the like. Furthermore, the droplet discharge apparatus may be a droplet discharge apparatus that discharges lubricating oil with pinpoint precision onto a precision machine such as a watch, a camera, or the like, or a droplet discharge apparatus that discharges a transparent resin liquid such as an ultraviolet curing resin onto a substrate to form a micro hemispherical lens (optical lens) or the like to be used for an optical communication element or the like. Furthermore, the droplet discharge apparatus may be a droplet discharge apparatus that discharges an etching solution such as acid or alkali to etch a substrate or the like.

This application claims priority under 35 U.S.C. § 119 to Japanese Patent Application No. 2017-098019, filed May 17, 2017. The entire disclosure of Japanese Patent Application No. 2017-098019 is hereby incorporated herein by reference.

What is claimed is:

1. A droplet discharge apparatus comprising:
   a head having nozzles capable of discharging droplets onto a medium;
   a heater configured to heat the medium onto which the droplets are discharged from the head;
   a blower fan configured to blow outside air from the outside to the inside of a casing that accommodates the head and the heater;
   a temperature sensor configured to detect a temperature of outside air blown by the blower fan, and
   a controller configured to cause the blower to reduce the volume of outside air blown into the casing if the temperature of outside air detected by the temperature sensor is less than a predetermined set temperature.

2. The droplet discharge apparatus according to claim 1, wherein the controller is further configured to cause the blower fan to reduce the volume of outside air blown into the casing if the temperature of outside air detected by the temperature sensor is less than the set temperature and an amount of droplets to be discharged per unit time by the head is greater than a predetermined set amount.

3. The droplet discharge apparatus according to claim 2, wherein the predetermined set amount of droplets is set as an index that indicates a degree of increase in humidity inside the casing.

4. The droplet discharge apparatus according to claim 3, wherein the predetermined set amount of droplets is set as an index that indicates a degree of increase in humidity inside the casing.

5. The droplet discharge apparatus according to claim 1, further comprising:
   a humidity sensor configured to detect a humidity of outside air blown by the blower fan,
   wherein the controller is configured to cause the blower fan to reduce the volume of outside air blown into the casing if the humidity of outside air detected by the humidity sensor is less than a predetermined set humidity.

6. The droplet discharge apparatus according to claim 5, wherein the controller is further configured to cause the blower fan to reduce the volume of outside air blown into the casing if the humidity of outside air detected by the humidity sensor is less than the set humidity and an amount of droplets to be discharged per unit time by the head is less than a predetermined set amount.

7. The droplet discharge apparatus according to claim 5, wherein the predetermined set humidity is a predetermined value at which clogging of the nozzles occurs.

8. The droplet discharge apparatus according to claim 1, wherein the set temperature is a predetermined value at which condensation occurs inside the casing.

9. A droplet discharge apparatus comprising:
a head having nozzles capable of discharging droplets onto a medium;
a heater configured to heat the medium onto which the droplets are discharged from the head;
a blower fan configured to blow outside air from the outside to the inside of a casing that accommodates the head and the heater; and
a temperature sensor configured to detect a temperature of outside air blown by the blower fan, and
a controller configured to cause the blower fan to reduce the volume of outside air blown into the casing if the temperature of outside air detected by the temperature sensor is less than a predetermined set temperature, and an amount of droplets to be discharged per unit time by the head is greater than a predetermined set amount.

10. The droplet discharge apparatus according to claim 9, wherein the set temperature is a predetermined value at which condensation occurs inside the casing.

* * * * *